Sept. 21, 1926.

W. E. BERGER

APPARATUS FOR HUSKING CORN

Filed Feb. 21, 1924    2 Sheets-Sheet 1

1,600,212

WALTER E. BERGER INVENTOR.

BY

*Edwin P. Corker* ATTORNEY.

Sept. 21, 1926.  W. E. BERGER  1,600,212
APPARATUS FOR HUSKING CORN
Filed Feb. 21, 1924  2 Sheets-Sheet 2

Walter E Berger INVENTOR.
BY
Edwin P Corbett ATTORNEY.

Patented Sept. 21, 1926.

1,600,212

UNITED STATES PATENT OFFICE.

WALTER E. BERGER, OF DUVALL, OHIO.

APPARATUS FOR HUSKING CORN.

Application filed February 21, 1924. Serial No. 694,200.

My invention relates to an apparatus for husking corn. It has to do with the provision of a novel combination of apparatus for positioning and removing the husk from the corn whereby the ear of corn is separated from the stalk and husk without in any way shredding or deteriorating the corn stalks.

In the past the husk has been removed from the ear both by hand and by machinery. In the hand method it has been customary to "open up" the husk along a longitudinal line and to remove the husk circumferentially of the ear in one general action. The "husker" never removes the corn husk sheaf by sheaf but quickly "opens up" the husk and removes the ear in one general action.

On the other hand, in the removing of corn husks by machinery, it has been the practice to feed the entire corn stalk between two rolls which mash or crush the stalk. In this method of removing the husk, when the ear of corn approaches these rolls, generally called "snapping rolls," the ear is "snapped" off from the stalk, due to the relative solidity and larger size of the ear and also due to the great longitudinal force applied longitudinally of the corn stalk.

It is my conception that this corn husking development has hitherto proceeded along improper lines. In the first place, in the feeding of the corn stalk between snapping rolls, it is necessary to provide an extremely large amount of power in order to snap off the ear of corn from the rest of the stalk as it is being fed through the rolls longitudinally, thus necessitating a very heavy structure with the resultant large amount of noise and wear and tear. Furthermore, the stalk of corn in passing through the snapping rolls is either mashed or shredded.

Therefore, my invention has to do primarily with an apparatus for positioning an ear of corn and removing the ear of corn from its husk without destroying the stalk of corn or separating the husk from the stalk. Such novel apparatus for husking the ear of corn while attached to the stalk comprises a means for receiving the ear of corn while it is still a part of the stalk, a novel means in combination with suitable husking fingers for positioning the ear while the husk is removed and a novel means for removing the separated husk and positively ejecting the ear of corn without in any way affecting the corn stalk.

One of the objects of my invention is the provision of novel rotating positioning and husk removing rolls, the revolution of the rolls being effective during one set of conditions to position the ear of unhusked corn and during another set of conditions to remove the husk from the ear of corn. In this case the corn stalk passes over the rolls while the rolls remove the husk from the ear of corn without exerting a large amount of power to snap the corn off from the stalk.

A further object of my invention has to do with the provision of grooved positioning and husk removing rolls, one of said rolls being resiliently pivoted to ensure the removal of different sized husks and parts from around the ear but to preclude the passage of the ear of corn between the rolls. In this case the husk removing fingers are designed to fit within the grooves in the rolls with the result that all of the husk will be positively moved to a point where it can be removed by the husk removing rolls.

Another object of my invention is the provision of resilient husking fingers for opening up and removing the husk around any size ear of corn and for positively removing the ear of corn from its stalk in case the corn still remains fastened to the stalk after the husk is removed.

Various other features of my invention will be apparent as this description progresses, and will be brought out in the claims appended hereto. The various objects of my invention are preferably obtained by the structure illustrated in the drawings, wherein similar characters of reference designate corresponding parts and wherein:

Figure 1:
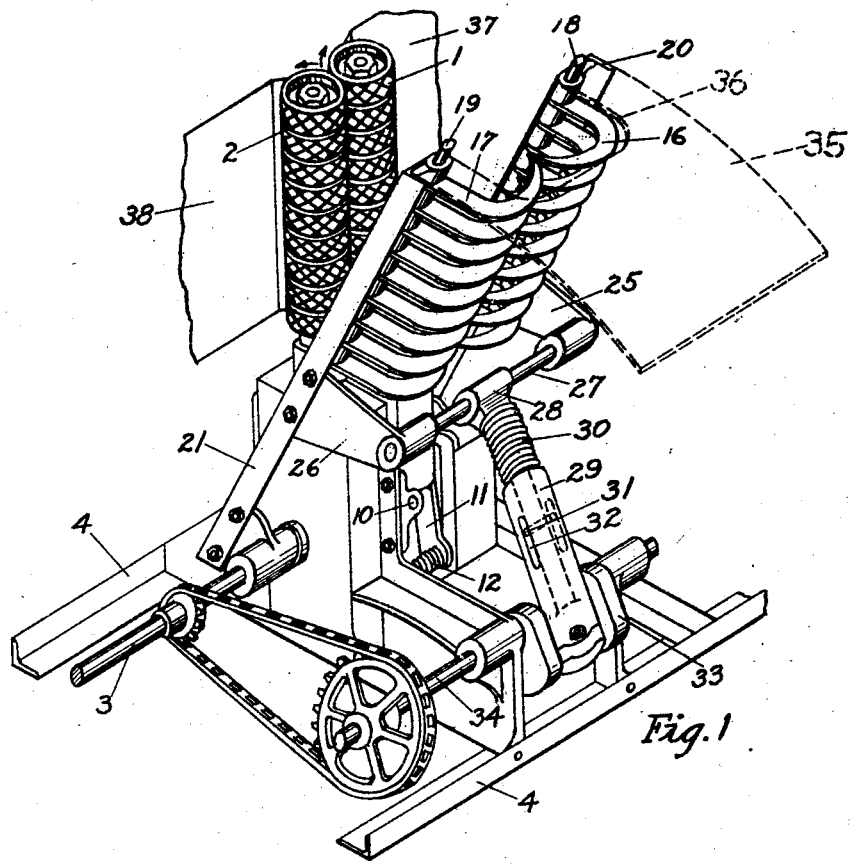
Figure 1 is a perspective view of the preferred form of my corn husking device showing in particular the positioning and husk removing rolls and the mechanism for reciprocating the fingers to and from the rolls.

In the drawings, and referring particularly to Figure 1, my corn husking apparatus is shown as comprising two vertically positioned rolls which may be designated 1 and 2. These rolls are designed to be continuously rotated in the direction indicated by the arrows by means of a suitable power shaft 3. The rolls, power shaft and other mechanism are designed to be supported by means of a suitable framework 4 which may be conveniently assembled with relation to other appropriate units as will be later described.

Figure 4:
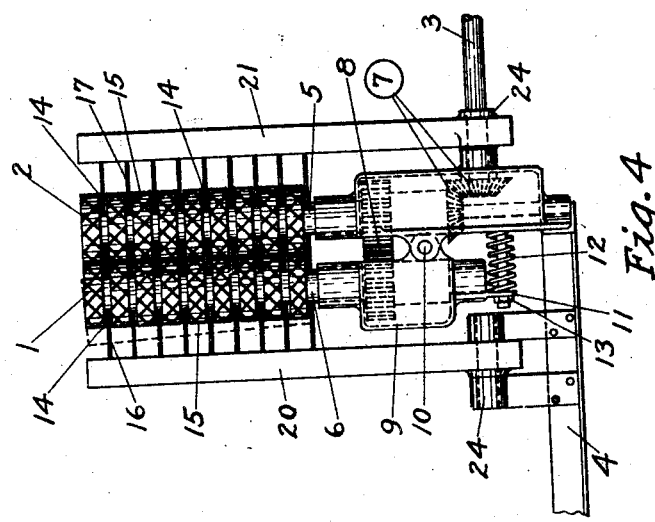
Figure 4 is a detail elevation of the positioning and husk removing rolls and showing the manner of resiliently positioning one of the rolls to accommodate different sized husks and particles.

As is best shown in Figure 4 the rolls 1 and 2 are provided with suitable shafts 5 and 6 which are designed to be rotated by means of suitable bevel gears 7 and intermeshing spur gears 8. The housing for the shaft 6 will be designated 9 and is pivoted as at 10. The lower part of this housing 9 is provided with an extension 11 which is normally resiliently held in a clockwise direction about the pivot 10 by means of a coil spring 12 and suitable adjusting nut 13.

The rolls 1 and 2 are provided with horizontal grooves 14 and the surfaces of the rolls between the grooves 14 are provided with diagonal grooves 15. The grooves 15 of one roll are designed to be effective to help in feeding the husk between the rolls but are so shaped and positioned as to be independent and not coincide in any specific manner with the grooves in the adjacent roll. It will be obvious that by pivoting the housing 9 at point 10 adjacent the spur gears 8 that the top of the roll 1 may be moved to a considerable distance from the roll 2 without disengaging the spur gears 8. It will also be understood that even if the roll which would be moved to such a great extent by a large object as to disengage the spur gears 8 the roll 2 would always continuously rotate and would be effective to feed any material between the rolls.

Figure 3:
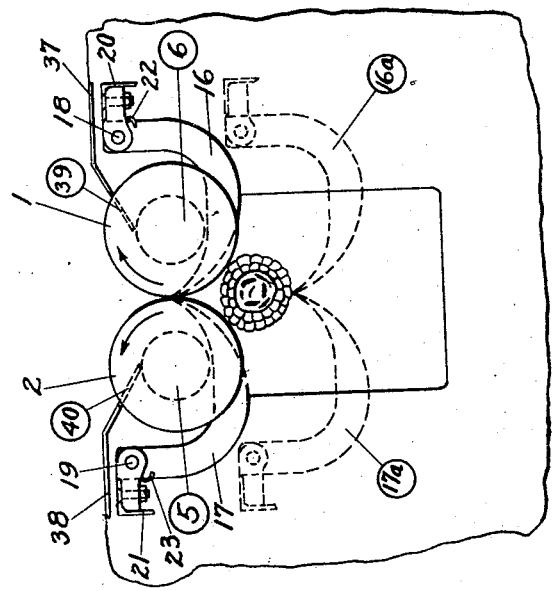
Figure 3 is a fragmentary plan view of the structure shown in Figure 1 showing the husking fingers in dotted lines just prior to the removal of the husk and in solid lines after the removal of the husk.

Designed to be reciprocated towards the rolls 1 and 2 are pairs of fingers 16 and 17. These fingers 16 and 17 are designed to be equal in number and fit into the grooves 14 of the respective rolls 1 and 2. They are preferably of a hook shape, the point of the hook of the fingers 16 being adjacent the points of the fingers 17 and the adjacent points being positioned in alinement with the center or contact points of the rolls 1 and 2, as best illustrated in Figure 3.

The fingers 16 and 17 are pivoted to suitable rods 18 and 19 which rods are carried by means of suitable arms 20 and 21. The hooks 16 and 17 are provided with suitable springs 22 and 23 whereby the hooks can be resiliently moved away from the general direction of the rolls 1 and 2 but are positively positioned so that they can not be moved towards the general direction of the rolls 1 and 2 beyond certain points. It will thus be obvious that when an ear of corn of any size is positioned between the rolls 1 and 2 and the hooks as shown in Figure 3, the fingers will be resiliently positioned to gradually pass around the ear of corn without destroying the grains but that when the fingers are moved backwardly after the removal of the husk they will positively ensure the removal of the husked ear.

The hook arms 20 and 21 are pivoted as at 24 and are also provided with suitable arms 25 and 26. The arms 25 and 26 are provided with a suitable connecting rod 27 which is designed to transmit the reciprocating motion of a rod 28 to the arms 20 and 21 whereby such arms will be oscillated about the pivots 24 and thus be moved into and out of husking relation with the rolls 1 and 2. The rod 28 is preferably slidably and resiliently connected with a rod 29 by means of a coil spring 30 which normally keeps a suitable pin 31 at the top of the slot 32.

The rod 29 is connected to a suitable crank 33 and this crank 33 is designed to be rotated by means of a suitable shaft 34. The shaft 34 is driven by the driving shaft 3 and obviously the reciprocation of the rod 29 and the hook fingers 16 and 17 are in timed relation to the rotation of the rolls 1 and 2.

It will be understood that the hook finger frame or reciprocating rods 20 and 21 may be provided with a suitable shield 35, as shown in Figure 1. This shield is preferably cut away as at 36 so that when the fingers 16 and 17 are positioned within the grooves of the rolls 1 and 2 the shield will be effective to prevent any ears of corn or other material from being dropped into the machine until the hook fingers return to their normal open position.

Suitable shields 37 and 38 are mounted adjacent the rolls 1 and 2, as best shown in Figure 3. These shields 37 and 38 are each provided with fingers 39 and 40 which extend into the grooves 14 of the rolls 1 and 2 and preferably contact with the shafts 5 and 6 of such rolls. It will be obvious that, with the shields 37 and 38 positioned as shown, any husk or other material when once fed between the rolls 1 and 2 will be precluded from returning to the other side of the rolls by means of such shields and the extending fingers of such shields.

Figure 2:
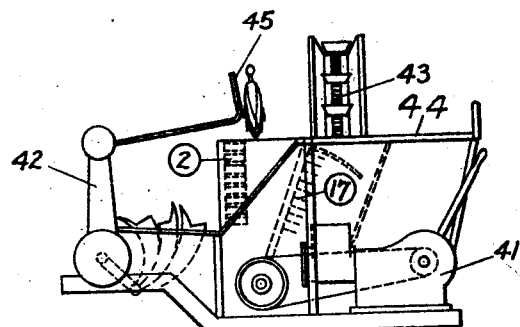
Figure 2 is a diagrammatic side elevation illustrating the manner in which my novel corn husking device may be combined with means for conveying the husked corn to a receptacle and means for bundling the stalks and husks after husking.

It will be understood that the ideal location for practical use of a corn husking machine of the class described is in the corn field itself, and for this reason I have shown the frame 4 of my corn husking apparatus of light construction whereby it can be mounted upon a suitable truck or adjacent a wagon or conveyor whereby the husked corn can be conveyed directly to a receptacle. In Figure 2 I have diagrammatically shown my corn husking apparatus in combination with a conveyor for feeding the husked corn to a wagon or receptacle and a standard bundler for bundling the stalks and husks after husking. In the peculiar adaptation of my husking apparatus as shown the motor 41 is designed to drive the bundler 42 and conveyor 43 as well as to operate the rolls 2 and the reciprocating hook fingers 17. In this figure the husking machine is shown provided with a table 44 for unhusked cut corn and a shield 45 for positioning the corn stalk in position to drop the ear in between the rolls 1 and 2 and the fingers 16 and 17.

In operation the rolls 1 and 2 are designed to continuously rotate in the direction shown in the figures and the hook fingers 16 and 17 are designed to be intermittently reciprocated to and from the rolls 1 and 2 and in timed relation to the speed of rotation of such rolls. A stalk of corn is then designed to be moved above the fingers 16 and 17 or along the table 44 to a position where the suspended unhusked ear of corn can be positioned between the rolls 1 and 2 and the husking fingers 16 and 17 as illustrated in Figure 3. The hook fingers 16 and 17 in moving towards the rolls 1 and 2 will contact with the ear of corn along a longitudinal line and continued movement of the hook fingers will grasp the husk and open the husk up and move the two halves of the husk around the ear of corn towards the rolls 1 and 2 as the fingers 16 and 17 are advancing towards the dotted line position 16ª and 17ª as shown in Figure 3. The rotating rolls 1 and 2 act as a stop or a means for positioning the ear of corn. These rolls continue to act as a positioning means until the resilient fingers 16 and 17 have opened up the husk and have started to pull it around the ear of corn when the grooves 15 on the rolls will grasp the loosened divided husk and pull it away from the kernels and between and through the rolls. At the same time the continued forward movement of the fingers 16 and 17 will remove all of the husk from around the ear towards the rolls and this movement of the fingers will be continued until they have passed around the ear of corn and have assumed a position in the grooves 14 in the rolls, as shown in Figures 3 and 4. Continued movement of the crank 33 will cause the fingers 16 and 17 to be moved away from the rolls 1 and 2 and if for any reason the stem connecting the husked ear of corn with the stalk is unbroken then the returning fingers will contact with the ear of corn and positively separate it from the stalk. It will be obvious that after the husk is opened up by the fingers that the husk will be moved through the rolls 1 and 2 and when the husk is thus moved the stalk attached to the husk will be moved in the same direction but above and out of contact with the rolls 1 and 2. If for any reason anything is placed between the rolls and the fingers which would prevent the finger arms from moving forward or the fingers themselves from moving then this motion will be taken up by the coil spring 30 in such a manner as to prevent breakage of any of the connecting parts.

It will be understood that the springs 22 and 23, which resiliently connect the fingers 16 and 17 with the rods 18 and 19, may be adjustable so that the tension of the finger points may be adjusted so that the fingers may exert more or less pressure upon the ear of corn when such fingers pass around the ear of corn to remove the husk therefrom.

It will also be understood that after the fingers pass around the ear of corn towards the rolls 1 and 2 and the husk is removed that the husked ear of corn may be conducted to the conveyor 43, shown in Figure 2 or to any suitable means by means of a suitable chute or other conductor which may be positioned below and to the outside of the fingers 16 and 17.

It will be seen that I have provided a novel and particularly simple corn husking apparatus which is of amply strong and compact construction and well adapted to receive and positively remove the husk from around the kernels. It will further be noted that the rolls for removing the husk are primarily arranged to act as positioning means whereby the husk is first opened and removed from the ear of corn in a manner simulating the exact process as is employed in a manual husking of corn. It will be further noted that these same positioning rolls are adapted to immediately remove the husk from around the ear of corn in the moment the husk is loosened by the husking fingers.

It will further be noted that I have provided a device for removing the husk from the ear of corn without in any way crushing or touching the corn stalk and that the husk is removed from around the ear while the ear is maintained in one position. It will also be noted that in Figures 1 and 2 I have shown the rods 18 and 19 extended up above the top of the fingers 16 and 17 for the purpose of positively pushing the corn stalk towards and past the rolls 1 and 2. Thus, the corn stalks will be positively moved and carried along with the corn husk leaving the space between the rolls 1 and 2 and the cradle structure or fingers 16 and 17 free for the positioning of a new corn stalk and the suspension therefrom of an ear of corn.

It will still further be noted that in providing resilient hook fingers 16 and 17 I have produced a cradle structure which will not only be effective to husk the ear but will assist in centering the ear. It will also be understood that any suitable cage structure may be arranged between the rolls 1 and 2 and the outer edge of the reciprocating cradle structure for positively positioning the ears and keeping them from being deflected to obstruct the movement of the reciprocating cradle structure.

Having thus described my invention what I claim is:

1. Apparatus for husking corn, comprising means for parting the husk along a longitudinal line and for pulling the same about the ear of corn, and means cooperating with said parting and pulling means to detach the parted husk.

2. Apparatus for husking corn, comprising means for parting the husk along a longitudinal line and for pulling the same about the ear of corn, and rotatable husking rolls cooperating with said means to detach the parted husk.

3. In corn husking apparatus, rotatable husking rolls and husking means movable toward and from said rolls for feeding the unhusked ear into contact with the said rolls and directly cooperating therewith to remove the husk from the ear.

4. In corn husking apparatus, vertically disposed rotatable husking rolls and reciprocable husking members adapted to feed the husk into contact with said rolls and to directly cooperate therewith to remove the husk from the ear.

5. In corn husking apparatus, vertically disposed rotatable husking rolls, reciprocable husking members adapted to feed the husk into contact with said rolls and to cooperate therewith to remove the husk from the ear, and means carried by said members adapted to remove the stalk as the said members are reciprocated away from said rolls.

6. In corn husking apparatus, vertically disposed rotatable husking rolls and reciprocable hook members adapted to feed the husks into contact with said rolls and to cooperate therewith to remove the husk from the ear.

7. Corn husking apparatus comprising husking rolls having grooves about their periphery in combination with reciprocable husking members, said members being adapted to register with said grooves.

8. Corn husking apparatus comprising husking rolls having grooves about their periphery in combination with reciprocable husking members and shields, said members and shields being adapted to register with said grooves.

9. Corn husking apparatus comprising vertically disposed husking rolls having grooves about their periphery in combination with reciprocable husking members and shields, said members and shields being adapted to register with said grooves.

10. Corn husking apparatus comprising vertically disposed husking rolls having grooves about their periphery, in combination with yieldably mounted husking members adapted to be reciprocated toward and away from said rolls, said members being adapted to register with said grooves.

11. Corn husking apparatus comprising vertically disposed rotatable rolls, husk parting fingers, and means for reciprocating said fingers toward and away from said rolls and in timed relation to the rotation of said rolls, said fingers being yieldably mounted.

In testimony whereof I hereby affix my signature.

WALTER E. BERGER.